US006697574B2

(12) United States Patent
Frigo et al.

(10) Patent No.: US 6,697,574 B2
(45) Date of Patent: Feb. 24, 2004

(54) MULTIPLE INPUT WAVEGUIDE GRATING ROUTER FOR BROADCAST AND MULTICAST SERVICES

(75) Inventors: Nicholas J. Frigo, Red Bank, NJ (US); Patrick P Iannone, Red Bank, NJ (US); Cedric F. Lam, Middletown, NJ (US); Kenneth C Reichmann, Hamilton Square, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/822,821

(22) Filed: Apr. 2, 2001

(65) Prior Publication Data

US 2002/0015204 A1 Feb. 7, 2002

Related U.S. Application Data

(60) Provisional application No. 60/193,970, filed on Mar. 31, 2000.

(51) Int. Cl.[7] .................................................. H04J 14/00
(52) U.S. Cl. .............................. 398/71; 398/84; 398/68
(58) Field of Search .................. 359/124, 127, 359/130; 398/84, 71, 66, 68

(56) References Cited

U.S. PATENT DOCUMENTS

| 5,440,416 A | * | 8/1995 | Cohen et al. ................ 359/127 |
| 5,742,414 A | | 4/1998 | Frigo et al. |
| 5,926,298 A | * | 7/1999 | Li ................................ 359/120 |
| 6,301,031 B2 | * | 10/2001 | Li ................................ 359/124 |

FOREIGN PATENT DOCUMENTS

| EP | 896448 A2 | * | 2/1999 | ............. H04J/14/02 |

OTHER PUBLICATIONS

Li, Yuan P. and L. G. Cohen. "Demonstration and Application of a Monolithic Two–PONs–in_One Device." 22nd European Conference on Optical Communication, vol. 2, Sep. 15–19, 1996, pp. 123–126.*

* cited by examiner

Primary Examiner—Jason Chan
Assistant Examiner—Christina Y Leung

(57) ABSTRACT

An optical telecommunications network suitable for carrying broadcast and switched services. The network includes a wavelength division multiplexing (WDM) coupled to a waveguide grating router (WGR). In accordance with the invention, an adjacent input port is connected with the same optical content. Thus, its outputs are adjacent (or wrapped around). According, the optical power in each of the broadcast bands at the outputs remains the same but is reduced by a factor of two in power for each channel but occupying twice as many channels. This has the effect of increasing the SNR by a factor of two.

2 Claims, 4 Drawing Sheets

US 6,697,574 B2

MULTIPLE INPUT WAVEGUIDE GRATING ROUTER FOR BROADCAST AND MULTICAST SERVICES

This non-provisional application claims priority based on provisional application U.S. Application No. 60/193,970 filed Mar. 31, 2000.

BACKGROUND OF THE INVENTION

The present invention generally relates to the field of telecommunication services and more particularly, is directed to performance and functionality improvements for broadcast and multicast services using multiple inputs of a waveguide grating router.

As known in the prior art, telecommunications services generally fall into two major categories. There are the so-called broadcast services in which all users receive the same information and the so-called switched services in which each user receives information specific to the specific user. Generally, network infrastructures can also be classified in the same way. An example of a broadcast infrastructure is the classical CATV networks and an example of a switched infrastructure is the public switched telephone network (PSTN). It usually is more economical to deliver broadcast services over broadcast network and switched services over switched networks.

Recent work has shown that the optical properties of certain passive devices can be exploited to permit a given infrastructure to emulate both broadcast and switched. See, for example, U.S. Pat. No. 5,742,414 entitled "Multiplicity of Services Via a Wavelength Division Router" which issued on Apr. 21, 1998. This patent teaches that the cyclical properties of a waveguide grating router (WGR) can be used in conjunction with wavelength division multiplexing (WDM) on several scales of granularity to provide flexible partitioning of both types of networks (broadcast and switched) using the same physical infrastructure. In particular, it is disclosed that by using the cyclical or periodic properties of the WGR (sometimes also called "Arrayed Waveguide Grating" (AWG), "Phased Array" (Phasar), or the "Dragone Router"), together with an optical source having a wide spectral emission favors broadcast delivery, while "line sources" with narrow spectra favors switched service delivery. The use of a wide optical spectrum floods the output optical channels so that each output port carries a replica, or spectral slice, of the signal on the input port. The linear properties of this passive device makes it possible to overlay both broadcast and switched services simultaneously on the same infrastructure.

The ability to segregate such services has been termed "WDM-on-WDM" in recognition that a coarser scale of WDM (on the order of the period, or "free spectral range" of the WGR) can be used to segregate a multiplicity of both broadcast and point-to-point services on an intrinsically "dense" WDM infrastructure traditionally used for point-to-point switched services.

Recent work has shown the possibilities of such a system to deliver large quantities of digital TV carriers using a particularly robust QPSK (quadrature phase shift keying) transmission format that permits the use of low quality and potentially inexpensive optical sources with wide optical bandwidths. In particular, it has been shown that both the wavelength domain and the RF domain can be used to deliver "blocks" of television programming. These demonstrations have delivered multiple 500 MHz blocks of QPSK modulated carriers from a Satellite service using the location of the optical band and the location of the RF block as a multiplexing index.

Presumably, the user would access this large video content by using a conventional satellite set top box. The set top box would have a front end formed of an optical filter to select the appropriate optical bands and an RF converter to select the appropriate RF carrier blocks. The user can, for a modest increase in cost due to the addition of the optical filter and RF conversion, use a conventional set-top box to access an order of magnitude more video than would otherwise be available to the user. This technique is illustrated in FIG. 1 where each rectangle 1 represents a "block" of service that could be provided to, for example, a conventional set-top box. The ability to provide such increases in capacity for low marginal cost is widely believed to be a necessary characteristic for success in the future for telecommunications operators.

FIG. 2 illustrates how rectangles 1 of FIG. 1 are created. The WDM 2 on the left separates the optical spectrum from the broadband source 16 into four optical bands 3, 4, 5 and 6 corresponding to vertical columns 7, 8, 9 and 10 of FIG. 1. Each of the optical bands is then RF modulated with modulators 11, 12, 13 and 14, respectively, with a composite signal representing the data in 4 independent RF blocks, corresponding to a vertical stack of blocks in FIG. 1. The combined broadcast signal at the output of the second WDM 15 in FIG. 2 is distributed to the end users through a WGR in the field. It should be appreciated that the broadcast signal is usually optically amplified, split and connected to multiple WGRs to achieve the maximum cost sharing of the head end equipment. FIG. 3 generally illustrates broadcast signal distribution to end users through WGRs.

A potential complication of this scheme arises from the fact that when multiple carriers are used in such systems, there are impairments created by the nature of the light itself. In particular, the use of incoherent light with a broad optical spectrum and high frequency modulation exacerbates an impairment known as "spontaneous—spontaneous beat noise," or sometimes referred to as "excess noise." Generally speaking, the signal-to-noise ratio (SNR) limited by spontaneous—spontaneous beat noise of the blocks as shown in FIG. 1 will be proportional to:

$$m^2(B_e/B_o)$$

where m is the modulation index (per subcarrier) the composite (4 blocks) signal, $B_o$ is the optical bandwidth of the sources (the horizontal width of the box), and $B_e$ is the electrical bandwidth of the detected signal (a subcarrier inside one of the boxes in FIG. 1).

In a commercial system, the bandwidth of the QPSK subcarriers is about 30 MHz. $B_e$ is given by in accordance with normal television standards. System considerations drives one to reduce $B_o$ (to fit more blocks into the given optical bandwidth of the transport system) and to reduce m (to fit more subcarriers into a vertical stack of blocks.) Considerations of optical noise necessitate that all the blocks be modulated on each vertical stack as a whole, rather than further multiplexing them optically. These factors conspire to make the signal quality deteriorate. What is needed is a way to increase the SNR by increasing the optical bandwidth of the signal.

SUMMARY OF THE INVENTION

Accordingly, it is an overall object of the present invention to obviate the above-noted shortcomings and disadvantages of telecommunication services known in the prior art.

A further object of the present invention is to provide an improved network for telecommunication services.

Another object of the present invention is to an provide improved network for telecommunication services which can be easily and inexpensively implemented.

A still further object of the present invention is to provide an improved telecommunications network using optical technology.

It is a specific object of the present invention to provide an improved telecommunications network using optical technology having increased bandwidth over such networks know in the prior art.

It is another specific object of the present invention to provide an improved telecommunications network using optical technology having improved signal-to-noise ratio over such networks known in the prior art.

These another objectives of the present invention are achieved by the present invention as described below.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

DESCRIPTION OF THE PREFERRED EMBODIMENT

In accordance with the present invention, optical bandwidth is increased by installing a power splitting coupler in the input arm and attaching the outputs of the power splitting coupler to distinct input ports of the WGR.

Figure 1:
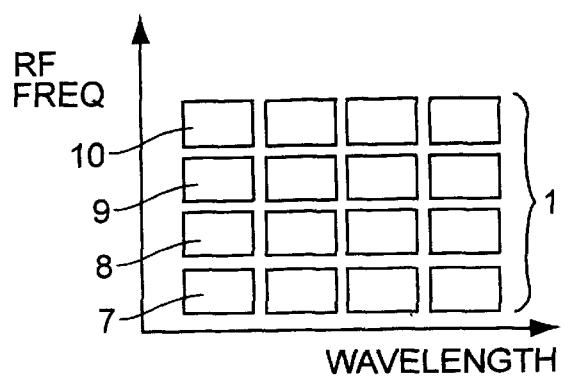
FIG. 1 is illustrates a frequency plan for WDM and RF multiplexed services.
Figure 2:
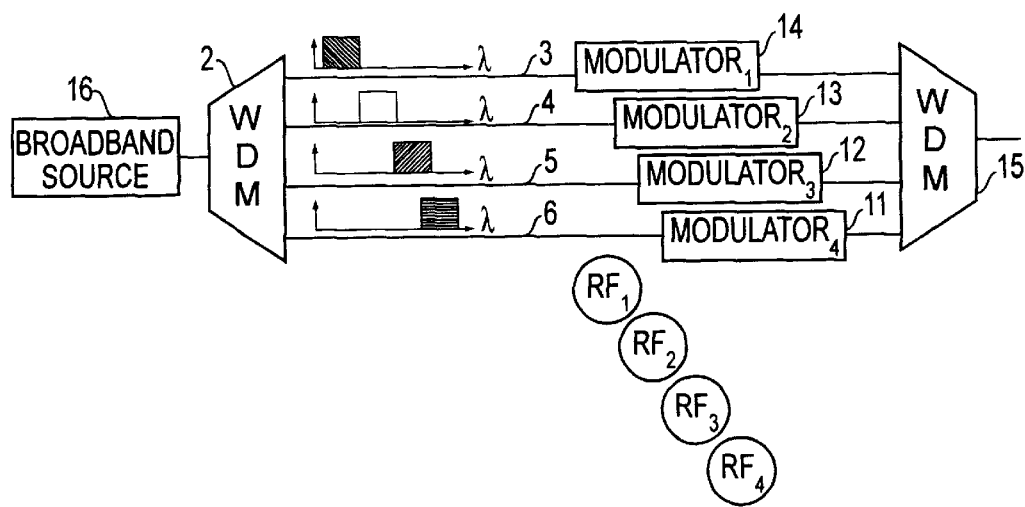
FIG. 2 illustrates the system set for generating the wavelength-frequency plan illustrated in FIG. 1.

In FIG. 3, heavy vertical lines, e.g., indicated by reference No. 30, represent the spectral bands defined by the system in FIG. 2. The smaller rectangles, e.g., illustrated by reference No. 31, correspond to the WDM channels defined by the WDM demultiplexer which is located near the subscriber's home. This WDM demultiplexer is a WGR, and, illustratively, the output fibers run, for example, to the individual subscribers.

Figure 3A:
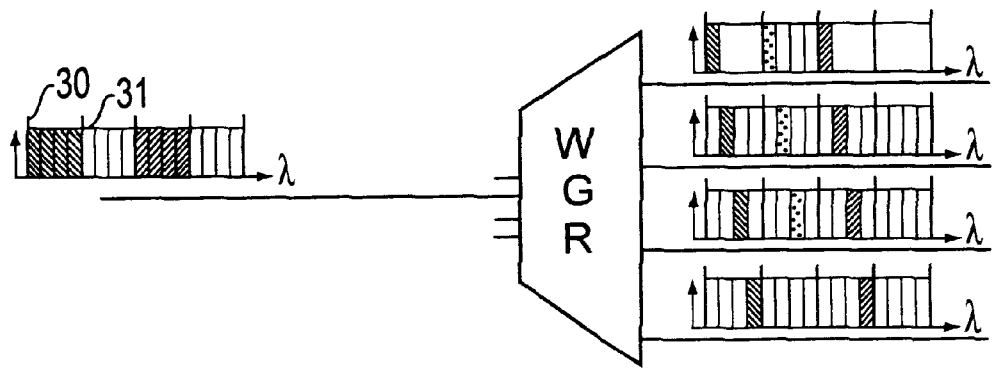
FIGS. 3a and 3b illustrate the effects of using multiple inputs to a WGR.

FIG. 3a illustrates the configuration disclosed in above mentioned U.S. Pat. No. 5,742,414. Each small rectangle 31 is a spectral slice, located in one of the service bands, and each slice carries a replica of the 4 RF blocks that were modulated as illustrated in FIG. 2. A coarse WDM (not shown) similar to the ones illustrated in FIG. 2 also is required at the user end to re-segregate the multiplicity of different services (either broadcast or switched) into individual optical spectral bands.

Figure 3B:
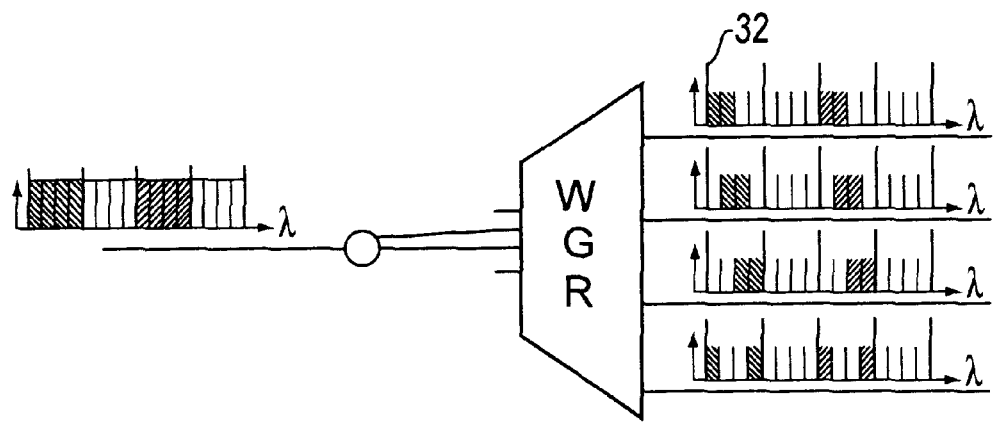

FIG. 3b illustrates the present invention. Note that the original input port is still attached so the bands on the output port are located in the same place, but reduced in optical power by 3 dB. Since an adjacent input port is connected with the same optical content, its outputs are adjacent (or wrapped around). Thus, the optical power in each of the bands (also separated by heavy vertical lines, e.g, as indicated by Reference No. 32) at the outputs remains the same but is reduced by a factor of two in power for each channel but occupying twice as many channels. As a result, the total photocurrent produced is unchanged at the optical detector. In other words, the electrical signal is the same but the spontaneous—spontaneous optical beat noise is decreased by one half. In other words, because the optical bandwidth is doubled, the SNR in each band is increased by two. A corresponding result is achieved when three input ports are used.

The above described technique of the present invention is especially useful in improving the performance of digital services for several reasons. First, by using a power splitter with even a modest number of ports, such as 4, the SNR can be quadrupled. In digital systems, the bit error rate is a very strong function of SNR. A modest SNR may lead to a BER of $2 \times 10^{-4}$, for instance, a bit rate associated with a relatively poor channel. If that SNR is quadrupled, the BER drops to $1.3 \times 10^{-12}$, i.e. leading to an improvement of BER by a factor of about 100,000,000. In addition, in digital systems it is possible to use Forward Error Correction which makes the transmission even more robust and the BER improvement an even stronger function of SNR improvement. Since both of the properties are present in existing digital video delivery systems, the technique of the present invention has great utility. It is for these reasons that it is possible to use LEDs (light emitting diodes), rather than very linear DFB lasers, to deliver video in a more cost-effective manner. Once the spontaneous—spontaneous beat noise with a given impairment is defeated, there is no further need for margin since $B_o$, $B_e$, and m are fixed.

Figure 4A:
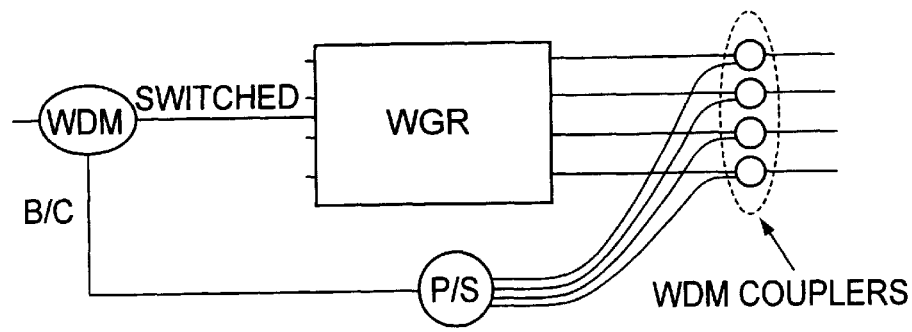
FIGS. 4a–4c illustrate various embodiments of WGR/Power Splitter connections for delivering both switched and broadcast services.

The techniques and concepts of the present invention lend themselves well to integration on silicon bench technology when compared, for example, to a "2 PONs in 1" device. Such a device is illustrated in FIG. 4a. In this device, switched services go directly to a port on the WGR so that they can be routed to individual output ports as a function of wavelength. Broadcast services, however, are stripped off of the input fiber by a WDM chosen to pick off these broadcast service boundaries. The light is directed to a power splitter (P/S), and then the light on each output arm of the splitter is re-multiplexed with the light on the output arms of the WGR by using a WDM on each arm. Advantages of this approach include the fact that the broadcast services can be delivered by a laser and thus can have high powers at relatively low cost. Disadvantages of this device include the fact that there are waveguides crossing other waveguides and that each arm must include a WDM. Thus, performance will be degraded and size and complexity will increase along with the cost of the optical chip.

Figure 4B:
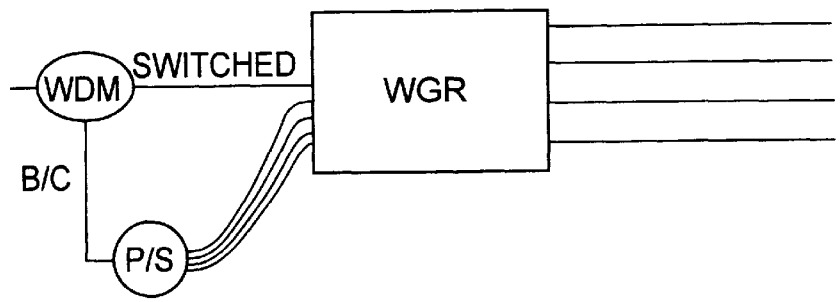

The device of the present invention is illustrated in FIG. 4b. Both devices, FIGS. 4a and 4b, share a WDM to segregate traffic, and both have a power splitter. But the device of the invention, however, runs the power splitter output lines into the WGR input lines. This approach does not require N WDMs in the output arms and yet performs the same functionality.

Figure 4C:
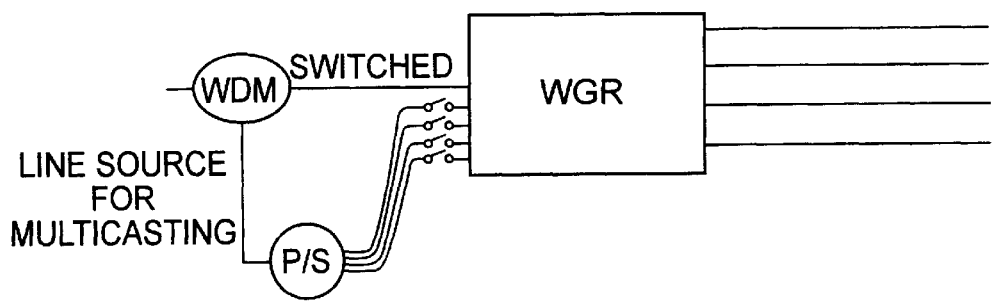

If all or most of the ports are covered with the output of the power splitter, a broadband is no longer needed to perform broadcasting, since a DFB, if it is aligned to the WGR, would also provide the same function. However, it should be noted that if all the WGR input ports are covered with the outputs of the power splitter, a WDM (not shown in FIG. 4) is needed to combine switched wavelengths with broadcast wavelengths into one of the WGR input ports. Furthermore, optical switches can also be incorporated between each WGR input port and power splitting coupler outputs to provide selective multicasting service when a line source is used. Optical switches using thermo-optic effect or MEMS (micro-electromechanical system) technology may be integrated with the WGR device. The multicast laser wavelength and the states of the optical switches determine which users obtain the service, according to the connection diagram of the WGR. This is illustrated in FIG. 4c.

Figure 5:
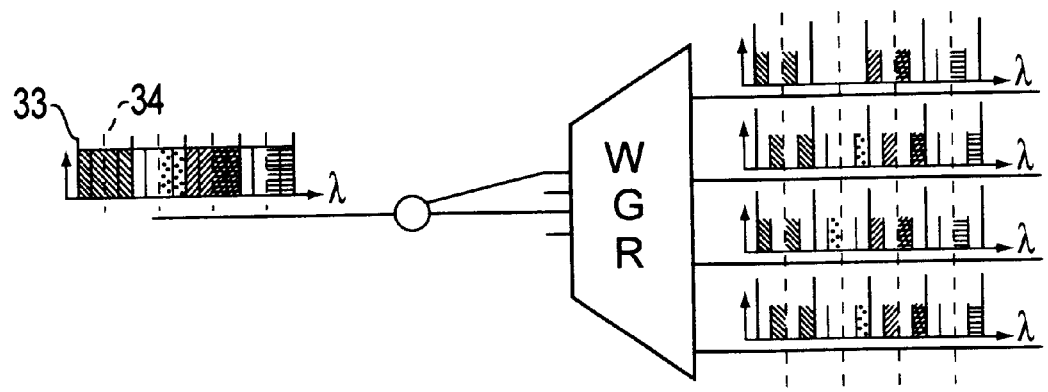
FIG. 5 illustrates a WGR/Power Splitter using multiple inputs to achieve optical spectrum reuse and improved signal-to-noise ratios.

The multiple power splitter outputs can also be connected to the WGR inputs which are several ports apart as shown in FIG. 5. As a result of the cyclical routing property of the WGR, the optical spectrum can be "reused" to broadcast the optical signal to all the WGR output ports using only a fraction of the WGR free spectral range (FSR). In FIG. 5, each FSR (separated by heavy lines, e.g., as indicated by reference No. 33) is further divided into two fractions separated by the dash lines, e.g., as indicated by reference No. 34. Each fractional FSR supports a different broadcast service (shown in FIG. 5 as different hatch patterns). The multiple WGR input connections ensure that each router output will have a copy of all broadcast signals even though each of them only occupies a fraction of the FSR.

One implication of broadcasting on a smaller fraction of the optical spectrum is that services are segregated on a finer granularity. This requires tighter optical filter technology. However, for the same target capacity, one does not have to stack as many broadcast signals in the RF domain since the optical spectrum is used more efficiently. Thus, multiplexing in the electronic domain is made simpler. The net result of modulating the optical carrier with fewer RF subcarriers is that the modulation index can now be increased. For a reduction of modulating RF subcarrier count by a factor of 2, the modulation index m can be increased by the square root of 2. Assume an optical spectrum reuse factor of 2 can achieve as illustrated in FIG. 5. Even though each service is carried only in one WGR channel slot, the spontaneous— spontaneous emission limited SNR is improved by a factor of 2. This is equivalent to the improvement achieved by using two WGR channel slots as discussed above. However, the fact that each broadcast service now occupies only one single WGR channel slot instead of multiples of them has the advantage of the system being much more tolerant to chromatic dispersion.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. An optical waveguide router for use in a telecommunications system carrying general broadcast information for a plurality of users and specific information for specific users, said optical waveguide router comprising:

an input signal source;

a waveguide division multiplexing device having an input and first and second outputs, said input being coupled to said input signal source;

a waveguide grating router device having first and second inputs and a plurality of outputs, said first input of said waveguide grating router being coupled to said first output of said wavelength division multiplexing device, said wavelength division multiplexing device passes said specific information to said first input of said waveguide grating router, wherein said specific information is routed to specific ones of said plurality of outputs of said waveguide grating router by said waveguide grating router as a function of the respective wavelength of said specific information;

a power splitter having an input and an output, said input of said power splitter being coupled to said second output of said wavelength division multiplexing device and said output of said power splitter being coupled to said second input of said waveguide grating router device, said wavelength division multiplexing device stripping off said broadcast information from said input signal source and routes said broadcast information to said input of said power splitter, wherein the signal at said output of said power splitter is multiplexed with the light signals at said second input of said waveguide grating router, wherein said wavelength division multiplexing device further including at least one optical switch between said output of said power splitter and said second input of said waveguide grating router.

2. The waveguide router of claim 1 wherein said optical switches is formed integral with said waveguide grating router.

* * * * *

UNITED STATES PATENT AND TRADEMARK OFFICE
CERTIFICATE OF CORRECTION

PATENT NO.     : 6,697,574 B2
DATED           : February 24, 2002
INVENTOR(S)   : Nicholas J. Frigo et al.

It is certified that error appears in the above-identified patent and that said Letters Patent is hereby corrected as shown below:

<u>Title page,</u>
Item [75], Inventors, "Hamilton Square" has been replaced by -- Yardville --.

Signed and Sealed this

Twenty-seventh Day of July, 2004

JON W. DUDAS
*Acting Director of the United States Patent and Trademark Office*